(12) United States Patent
Abe

(10) Patent No.: US 7,259,683 B2
(45) Date of Patent: Aug. 21, 2007

(54) RACK

(75) Inventor: Takashi Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 851 days.

(21) Appl. No.: 10/716,399

(22) Filed: Nov. 20, 2003

(65) Prior Publication Data

US 2004/0172155 A1    Sep. 2, 2004

(30) Foreign Application Priority Data

Nov. 26, 2002  (JP)  ............................ 2002-342819

(51) Int. Cl.
```
G08B 3/00      (2006.01)
G08B 21/00     (2006.01)
G08B 23/00     (2006.01)
H05K 5/00      (2006.01)
H05K 7/00      (2006.01)
H05K 1/18      (2006.01)
H01R 3/00      (2006.01)
G01D 11/00     (2006.01)
```

(52) U.S. Cl. ...................... 340/635; 340/654; 340/687; 340/691.1; 340/693.9; 340/815.4; 361/733; 361/760; 361/778; 361/779; 361/788; 361/803; 439/488; 439/489; 439/490; 439/491; 116/200; 116/202; 116/209; 116/230; 116/280

(58) Field of Classification Search ................ 340/635, 340/654, 687, 691.1, 693.9, 815.4; 361/600–837; 439/488–491; 116/200–280
See application file for complete search history.

(56) References Cited

U.S. PATENT DOCUMENTS

| | | | | |
|---|---|---|---|---|
| 5,253,140 A | * | 10/1993 | Inoue et al. | ................. 361/728 |
| 5,483,229 A | * | 1/1996 | Tamura et al. | ........... 340/691.7 |
| 5,754,112 A | * | 5/1998 | Novak | ......................... 340/635 |
| 6,107,929 A | * | 8/2000 | Amari | ........................ 340/687 |
| 6,785,131 B2 | * | 8/2004 | Ewell et al. | ................. 361/686 |
| 6,867,701 B2 | * | 3/2005 | Lawrence et al. | .......... 340/635 |
| 2004/0212511 A1 | * | 10/2004 | Ahrens et al. | .............. 340/635 |

FOREIGN PATENT DOCUMENTS

JP           9-330184 A    12/1997

* cited by examiner

*Primary Examiner*—Benjamin C. Lee
*Assistant Examiner*—Lam Pham
(74) *Attorney, Agent, or Firm*—Sughrue Mion, PLLC

(57) ABSTRACT

A rack has a plurality of LEDs arranged on the front surface thereof correspondingly to respective units. The rack is provided with an LED lighting circuit which lights these LEDs, on the back of a display section and an input section. The LED lighting circuit has an LED lighting control section and a memory. The LED lighting control section acquires correspondence relation information indicating correspondence between servers and apparatuses from the input section, and stores the information in the memory. When a server is selected, the LED lighting circuit lights some of the plurality of LEDs based on the correspondence relation information stored in the memory.

6 Claims, 7 Drawing Sheets

| | Unit | | | | | | | | | | | | | | | | | | |
|---|---|---|---|---|---|---|---|---|---|---|---|---|---|---|---|---|---|---|---|
| | 01 | 02 | 03 | 04 | 05 | 06 | 07 | 08 | 09 | 10 | 11 | 12 | 13 | 14 | 15 | 16 | 17 | 18 | 19 |
| Server 01 | | ○ | ○ | ○ | | ○ | ○ | | | | | | | | | ○ | ○ | | |
| Server 02 | | ○ | | | ○ | ○ | ○ | | | | | | | | | ○ | ○ | | |
| Server 03 | ○ | ○ | | | | | | ○ | ○ | | | ○ | ○ | ○ | ○ | | | ○ | ○ |
| Server 04 | ○ | ○ | | | | | | | | ○ | | ○ | ○ | | | | | ○ | ○ |
| Server 05 | ○ | ○ | | | | | | | | | ○ | ○ | ○ | | | | | ○ | ○ |

*FIG. 4*

RACK

BACKGROUND OF THE INVENTION

1. Field of the Invention

The present invention relates to a rack.

2. Description of the Related Art

There is provided a rack on which a plurality of apparatuses can be shelved. For example, a plurality of servers and a plurality of apparatuses to be connected to each server are shelved on this rack. This is to save space by shelving various electronic apparatuses on the rack.

The rack is adaptable to such a use as that a plurality of apparatuses having the same function are shelved and connected to different servers independently, and that a single apparatus is connected to a plurality of servers and the plurality of servers share the single apparatus.

When data stored in a server shelved on this type of rack is to be backed up or when the battery of a Uninterruptible Power Supply shelved on this type of rack is to be replaced with a new one, it is necessary to identify connective relations between servers and apparatuses.

However, it is impossible to identify connective relations between servers and apparatuses just by looking at the rack from its front. Therefore, in order to carry out the above kinds of works, the operator has to memorize the connective relations when he/she connects the apparatuses, or has to check the cable connections at the back of the rack when actually carrying out the works.

Meanwhile, there is proposed in, for example, Unexamined Japanese Patent Application KOKAI Publication No. H09-330184, an invention for use in a RAID (Redundant Arrays of Inexpensive Disks) system, which is capable of specifying the numbers, etc. assigned to disk devices or bodies of disks by lighting LEDs (Light Emitting Diodes) corresponding to the respective disk devices.

However, it is not always the case that each apparatus to be shelved on the rack has a display device for displaying the connective relation of the apparatus. Further, since each apparatus to be shelved on the rack is a finished product, it is impossible to attach a display element to each apparatus or to modify the circuit of each apparatus unlike the case of the above-mentioned system.

SUMMARY OF THE INVENTION

The present invention was made in view of the above-described problem, and an object of the present invention is therefore to provide a rack capable of easily identifying connective relations of apparatuses shelved thereon.

To achieve the above object, a rack according to a first aspect of the present invention is a rack for shelving a plurality of devices independently in shelving units, the rack comprising:

a storage section which pre-stores correspondence relation information indicating correspondence relations between the plurality of devices and shelving units in which apparatuses connected to the plurality of devices are shelved; and an indication section which indicates a shelving unit in which an apparatus connected to a device designated from among the plurality of devices is shelved, based on the correspondence relation information stored in the storage section.

The indication section may include:

shelving indication elements which correspond to the shelving units respectively; and an indication control section which controls the shelving indication elements to indicate a shelving unit in which an apparatus connected to a device designated from among the plurality of devices is shelved, based on the correspondence relation information stored in the storage section.

The shelving indication elements may be arranged at positions corresponding to the shelving units respectively.

The indication control section may be structured to link an indication control on the shelving indication elements with designation information for designating any of the plurality of devices shelved in the shelving units.

A rack according to a second aspect of the present invention is a rack for shelving a plurality of servers and apparatuses connected to the respective servers independently in shelving units, the rack comprising:

a storage section which pre-stores correspondence relation information indicating correspondence relations between the servers and the shelving units in which the apparatuses connected to the respective servers are shelved; and an indication section which indicates a shelving unit in which an apparatus connected to a designated server is shelved, based on the correspondence relation information stored in the storage section.

The rack may comprise a server switch unit which includes switches for selecting the respective servers and lighting elements for indicating a server selected by any of the switches.

In this case, the indication section may link its indication operation with operations made to the switches.

BRIEF DESCRIPTION OF THE DRAWINGS

These objects and other objects and advantages of the present invention will become more apparent upon reading of the following detailed description and the accompanying drawings in which:

FIG. 4 is an explanatory diagram showing an example of correspondence relation information stored in a memory shown in FIG. 3;

DETAILED DESCRIPTION OF THE PREFERRED EMBODIMENT

A rack according to an embodiment of the present invention will now be explained with reference to the drawings.

Figure 1:
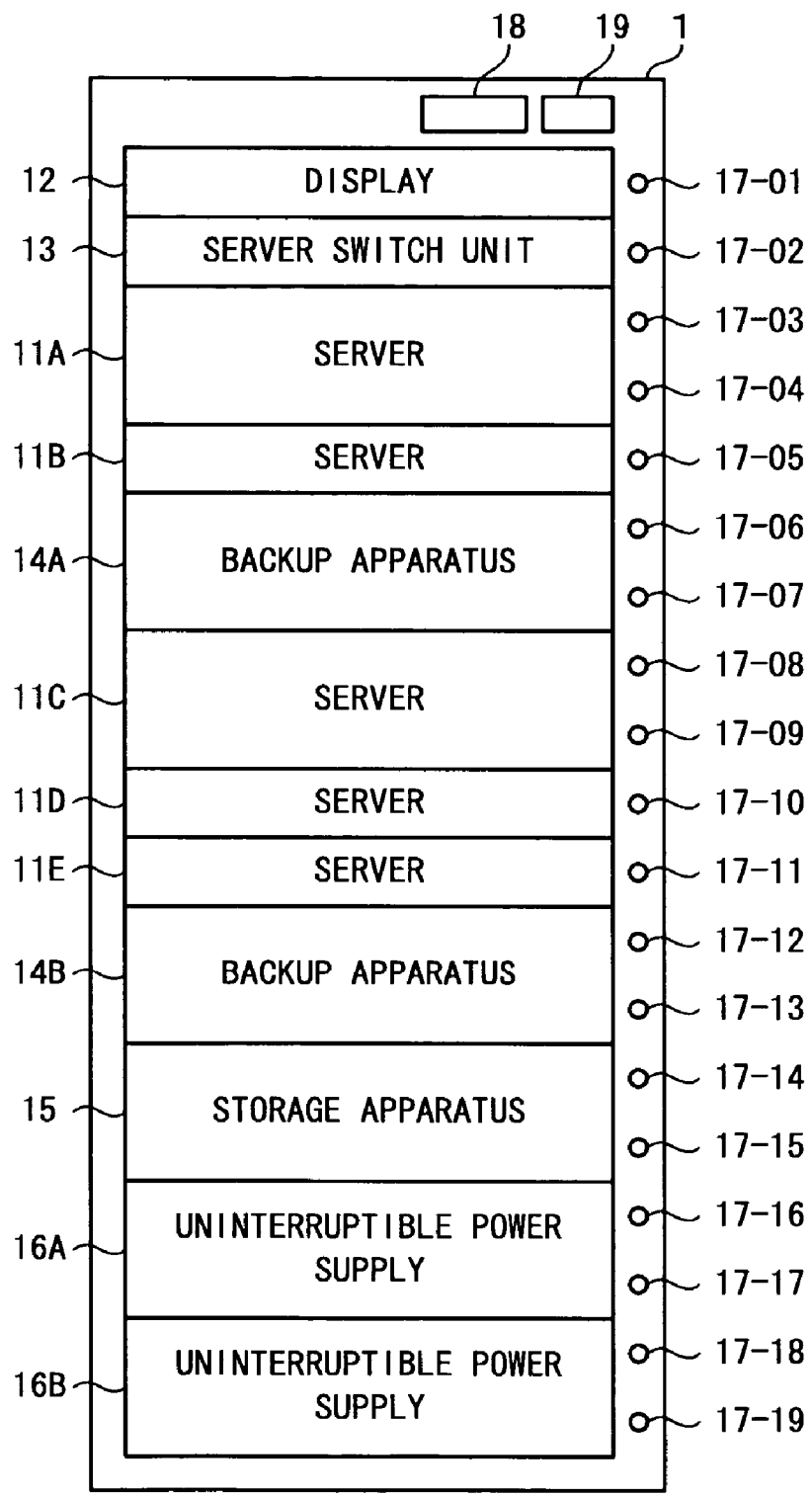
FIG. 1 is a front elevation of a rack according to an embodiment of the present invention on which a plurality of apparatuses are shelved.

An example of a case where a plurality of apparatuses are shelved on the rack according to the present embodiment is shown in FIG. 1.

Servers 11A to 11E, a display 12, a server switch unit 13, backup apparatuses 14A and 14B, a storage apparatus 15, and Uninterruptible Power Supplies (UPS) 16A and 16B are shelved on the rack 1.

The rack 1 can shelve an apparatus in each unit. The "unit" is a shelving section adaptable to the minimum size of the apparatus to be shelved. The rack 1 may shelve one apparatus in one unit like the display 12, or may shelve an apparatus having a large size in two units like the server 11A. The rack 1 can shelve all kinds of apparatuses by adapting the unit to the minimum size of the apparatus to be shelved.

The rack 1 comprises LEDs 17-01 to 17-19, a display section 18, and an input section 19.

The LEDs (Light Emitting Diodes) 17-01 to 17-19 are provided so that the positions of apparatuses connected to the servers 11A to 11E can be visually identified. The LEDs 17-01 to 17-19 are set on the front surface of the rack 1 correspondingly to the respective units. The LEDs 17-01 to 17-19 are shelving indication elements which correspond to the shelving units respectively.

Figure 2:
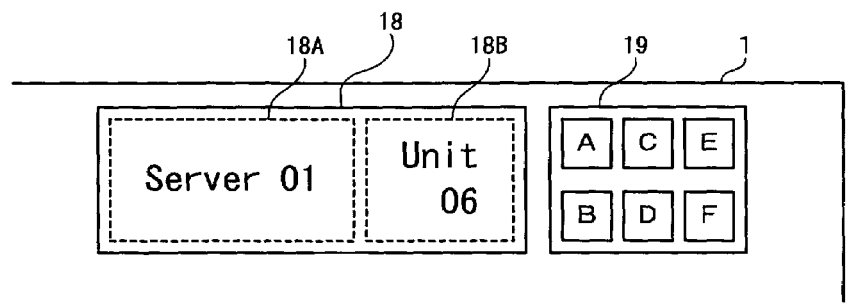
FIG. 2 is an explanatory diagram showing the detail of a display section and an input section which are provided to the rack shown in FIG. 1.

The display section 18 is for displaying server numbers and unit numbers, and constituted by a liquid crystal display, an LED display, etc. The display section 18 comprises a server number display area 18A for displaying a server number, and a unit number display area 18B for displaying a unit number, as shown in FIG. 2.

The input section 19 is for inputting various information. As shown in FIG. 2, the input section 19 comprises buttons A to F.

The buttons A and B are for switching display on the server number display area 18A.

The buttons C and D are for switching display on the unit number display area 18B.

The button E is for selecting data displayed on the display section 18.

The button F is for canceling the selected data.

Figure 3:
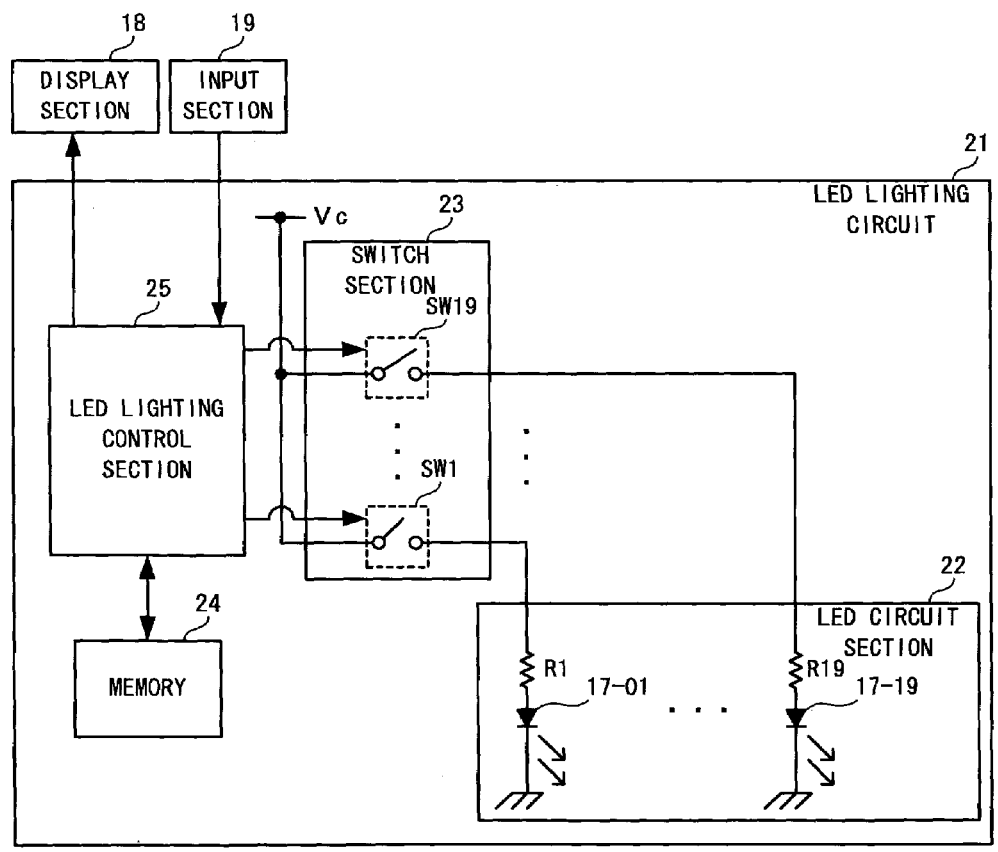
FIG. 3 is a block diagram showing a structure of an LED lighting circuit of the rack shown in FIG. 1.

The rack 1 comprises an LED lighting circuit 21 shown in FIG. 3. This LED lighting circuit 21 is for lighting the LEDs 17-01 to 17-19, and includes an LED circuit section 22, a switch section 23, a memory 24, and an LED lighting control section 25.

The LED circuit section 22 is constituted by the LEDs 17-01 to 17-19, and resistors R1 to R19. The resistors R1 to R19 are respectively resistors for restricting the current flowing through the LEDs 17-01 to 17-19.

The switch section 23 is for supplying a current to the LEDs 17-01 to 17-19 from a power source having a voltage Vc, and comprises switches SW1 to SW19. The switches SW1 to SW19 may be mechanical switches or may be constituted by transistors, etc.

One end of each of the switches SW1 to SW19 of the switch section 23 is connected to the power source. One end of each of the resistors R1 to R19 is connected to the other end of each of the switches SW1 to SW19. The anode of each of the LEDs 17-01 to 17-19 is connected to the other end of each of the resistors R1 to R19. The cathode of each of the LEDs 17-01 to 17-19 is grounded.

When each of the switches SW1 to SW19 is closed, a current flows from the power source to the LEDs 17-01 to 17-19 via the switches SW1 to SW19 and the resistors R1 to R19. With the flow of the current, the LEDs 17-01 to 17-19 emit light in a light emitting amount corresponding to the amount of the current.

The memory 24 stores correspondence relation information shown in FIG. 4, indicating correspondence relations between the servers 11A to 11E and the units. In FIG. 4, the circle symbols show the correspondence relations between the servers 11A to 11E and apparatuses connected thereto, by server numbers and unit numbers. For example, the server corresponding to the server number "Server01" is the server 11A, and the circle symbol in the topmost section of the column of the unit number "Unit02" indicates that the apparatus connected to the server 11A is the server switch unit 13 shelved in the unit assigned the unit number "Unit02".

The LED lighting control section 25 controls opening and closing of the switches SW1 to SW19 of the switch section 23 based on the correspondence relation information stored in the memory 24. For example, suppose that the server number "Server01" is selected (designated). As shown in FIG. 4, the server assigned the server number "Server01" is connected to the apparatus corresponding to the unit number "Unit06". In this case, the LED lighting control section 25 closes the switch SW6 to light the LED 17-06 corresponding to the unit number "Unit06".

The LED lighting control section 25 acquires correspondence relation information from the input section 19 and writes the information in the memory 24. When any of the servers is selected, the LED lighting control section 25 controls to display the server number of the selected server and the unit number corresponding to the apparatus connected to this server on the display section 18.

The switch section 23, the memory 24, and the LED lighting control section 25 are arranged on the back of display section 18 and the input section 19.

An operation of the rack 1 according to the present embodiment will now be explained.

When the buttons A to F of the input section 19 are operated and correspondence relation information is input, the LED lighting control section 25 of the LED lighting circuit 21 acquires the input correspondence relation information from the input section 19.

When the buttons A and B are pushed, the LED lighting control section 25 controls to display server numbers sequentially on the display section 18. When the server number "Server01" is displayed on the server number display section 18A and the button E is pushed, the server number "Server01" is selected. In the example of shelving shown in FIG. 1, the server assigned the server number "Server01" is the server 11A.

Next, when the buttons C and D are pushed, the LED lighting control section 25 controls to display unit numbers sequentially on the display section 18. When the button E is pushed while the unit number "Unit06" is displayed on the unit number display section 18B as shown in FIG. 2, the unit number "Unit06" is selected as the unit number corresponding to the apparatus which is connected to the server 11A assigned the server number "Server01". When the unit number "Unit06" is selected, the LED lighting control section 25 lights the LED 17-06.

Further, the LED lighting control section 25 stores correspondence relation information indicating that the apparatus corresponding to the unit number "Unit06" is connected to the server assigned the server number "Server01", in the memory 24.

Next, when the buttons C, D, and E are pushed and thereby the unit number "Unit07" is selected, the unit number "Unit07" is displayed on the unit number display section 18B. Then, likewise the above case, the LED lighting control section 25 lights the LED 17-07 and stores correspondence relation information indicating that the apparatus corresponding to the unit number "Unit07" is connected to the server assigned the server number "Server01" in the memory 24. In the example of shelving shown in FIG. 1, the apparatus corresponding to the unit numbers "Unit06" and "Unit07" is the backup apparatus 14A.

In order to cancel correspondence relation information regarding any selected server number and any selected unit number, the button F needs to be pushed. For example, if the button F is pushed when the server number "Server01" is displayed on the server number display section 18A and the unit number "Unit06" is displayed on the unit number display section 18B, the LED lighting control section 25A deletes the correspondence relation information regarding this correspondence from the memory 24.

By operating the buttons of the input section 19 with respect to the server numbers "Server01" to "Server05" in the above-described manner, such correspondence relation information as shown in FIG. 4 is stored in the memory 24.

When all correspondence relation information is stored in the memory 24, and thereafter a server number is selected by pushing the buttons A and B, the LED lighting control section 25 reads out correspondence relation information from the memory 24 based on this operational information. Then, the LED lighting control section 25 controls opening and closing of the switches SW1 to SW19 of the switch section 23 based on the read-out correspondence relation information in order to light the LEDs 17-01 to 17-19.

For example, if the server number "Server01" is selected, it is known that the apparatuses shelved in the units assigned the unit numbers "Unit02" to "Unit04", "Unit06", "Unit07", "Unit16", and "Unit17" are connected to the server assigned the server number "Server01", as shown in FIG. 4.

As shown in FIG. 1, the server assigned the server number "Server01" is the server 11A. Further, the apparatus shelved in the unit assigned the unit number "Unit02" is the server switch unit 13. Likewise, the apparatuses shelved in the units assigned the unit numbers "Unit03", "Unit04", "Unit06", "Unit07", "Unit16", and "Unit17" are the server 11A, the backup apparatus 14A, and the Uninterruptible Power Supply 16A, respectively.

The LED lighting control section 25 closes the switches SW2 to SW4, SW6, SW7, SW16, and SW17, based on the correspondence relation information read out from the memory 24.

When, for example, the switch SW2 is closed, a current flows from the power source having the voltage Vc to the LED 17-02 via the resistor R2, and the LED 17-02 thereby emits light. In the same manner, the LEDs 17-03, 17-04, 17-06, 17-07, 17-16, and 17-17 emit light.

Figure 5:
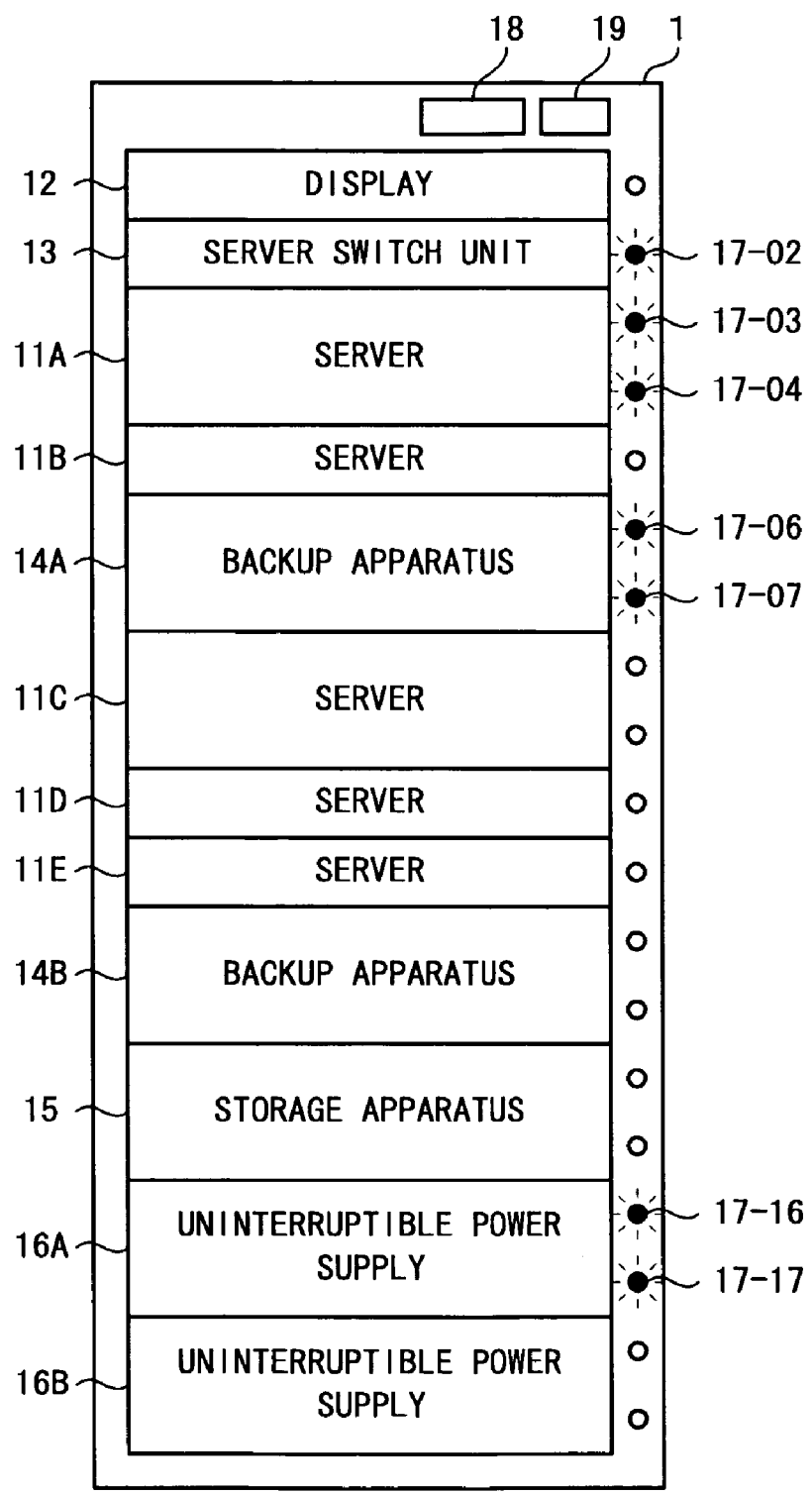
FIG. 5 is an explanatory diagram showing an example of a case where LEDs are lit based on the correspondence relation information shown in FIG. 4.

When the LEDs 17-02 to 17-04, 17-06, 17-07, 17-16, and 17-17 are lit as shown in FIG. 5, it is possible to identify the units in which the apparatuses connected to the server 11A are shelved. Therefore, it is possible to visually identify connections that the server switch unit 13, the backup apparatus 14A, and the Uninterruptible Power Supply 16A are connected to the server 11A.

As explained, according to the present embodiment, those among the LEDs 17-01 to 17-19 that correspond to the units in which the apparatuses connected to the selected server are shelved are lit based on the correspondence relation information stored in the memory 24.

Accordingly, it is possible to easily identify to which apparatuses the selected server is connected from the front of the rack 1. Because of this, it is unnecessary for the operator to memorize the connection relations or to check the cable connections on the back of the rack 1 on every occasion of maintenance or checking works, making it easier to carry out maintenance and checking works.

For example, in a case where data stored in a specific server is to be backed up, the back up work can be carried out immediately. Further, in a case where the battery of the Uninterruptible Power Supplies 16A or 16B is to be replaced with a new one, it is possible to carry out the replacement without turning off the power sources of all the other apparatuses.

Furthermore, in a case where densification of a server to be shelved on the rack progresses, the number of apparatuses to be shelved on the rack is thereby increased, and thus the connection relations between the apparatuses become complicated, there is no fear of any mistakes in identification of the connection relations.

Moreover, even if an apparatus to be shelved on the rack is not provided with a display device for displaying the connection relation of the apparatus, there is no need of equipping the apparatus with a display element or of modifying the circuit of the apparatus.

The present invention is not limited to the above-described embodiment, but can be carried out in various embodiments.

For example, in the above-described embodiment, the LEDs 17-01 to 17-19 are lit by operating the input section 19. However, the present invention is not limited to this, but the LEDs 17-01 to 17-19 may be lit in conjunction with switching operations made to the server switch unit 13 shelved on the rack 1.

Figure 6:
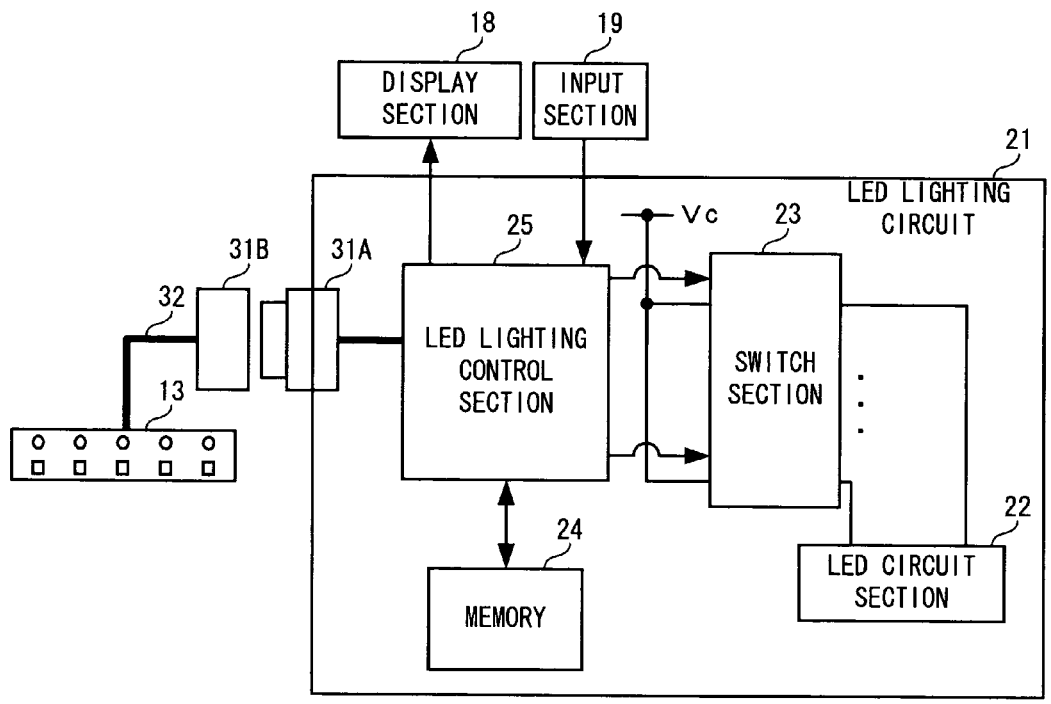
FIG. 6 is a circuit diagram showing a modified example of the LED lighting circuit.

The structures in this case of the LED lighting circuit 21 and server switch unit 13 are shown in FIG. 6. The rack 1 comprises connectors 31A and 31B, and a cable 32 in order to connect the server switch unit 13 and the LED lighting control section 25 of the LED lighting circuit 21.

The connector 31A is a connector on the side of the LED lighting circuit 21, while the connector 31B is a connector on the side of the server switch unit 13. The server switch unit 13 and the connector 31B are connected to each other via the cable 32. By the connector 31A and connector 31B being connected to each other, the server switch unit 13 and the LED lighting control section 25 are connected to each other.

Figure 7:
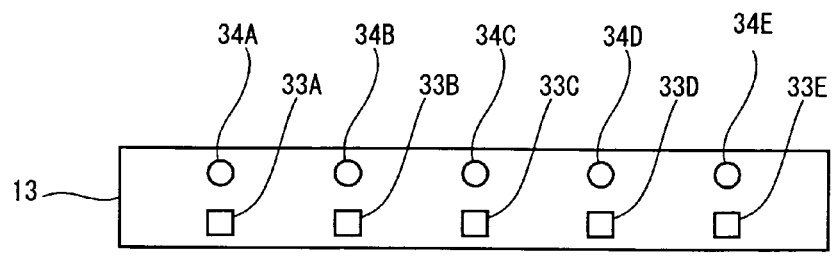
FIG. 7 is an explanatory diagram showing a server switch unit shown in FIG. 6.

As shown in FIG. 7, the server switch unit 13 comprises switches 33A to 33E, and LEDs 34A to 34E.

The switches 33A to 33E are used for selecting the servers 11A to 11E, respectively.

The LEDs 34A to 34E are used for showing that the servers 11A to 11E are selected.

The LED lighting control section 25 acquires on/off information regarding whether the switches 33A to 33E are switched on or off from the server switch unit 13.

Figure 8:
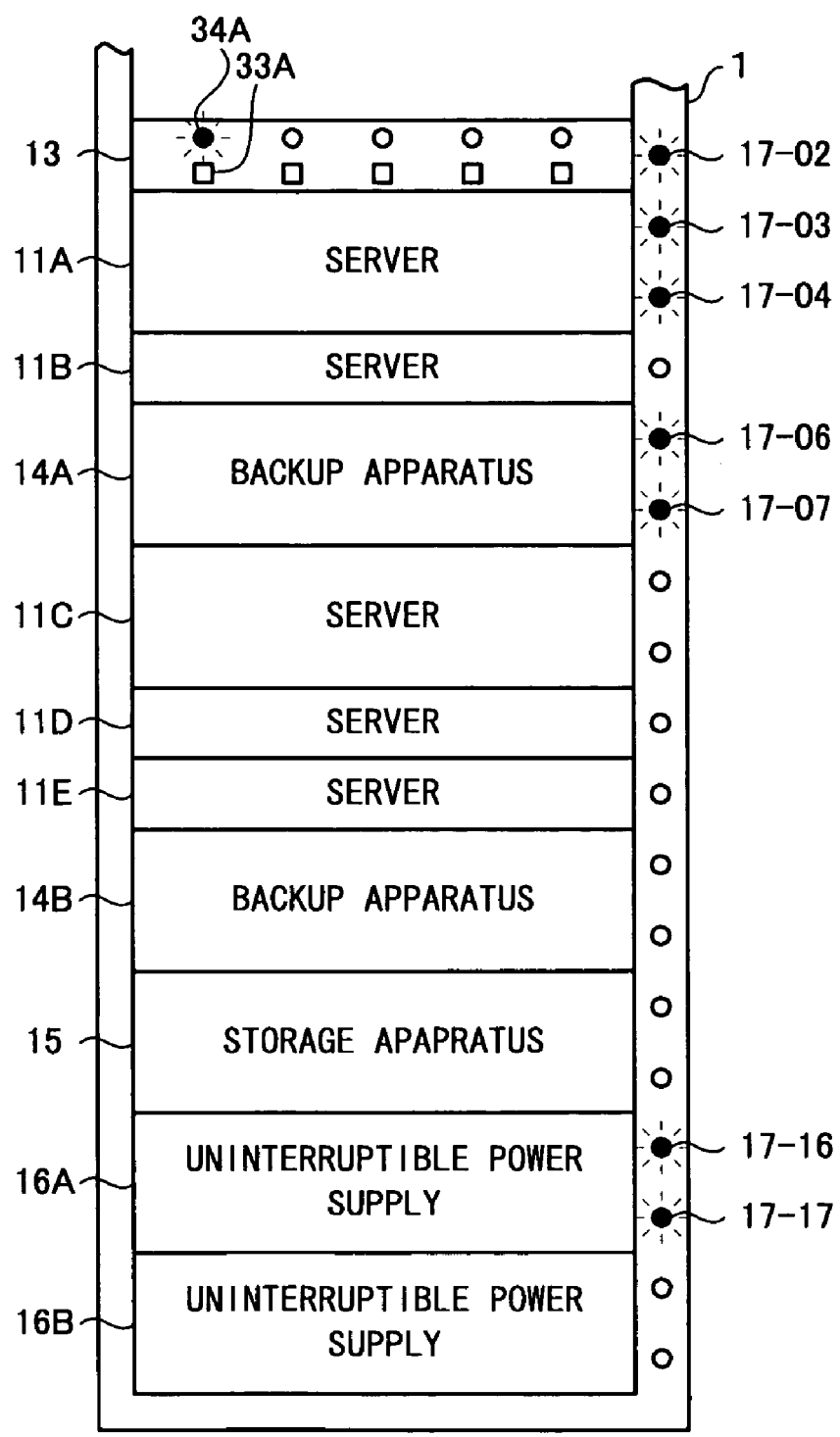
FIG. 8 is an explanatory diagram showing an example of a case where the LEDs are lit according to the modified example of the LED lighting circuit shown in FIG. 6.

When, for example, the switch 33A is pushed, the server 11A is selected. In this case, the LED 34A is lit as shown in FIG. 8. The LED lighting control section 25 acquires information that the switch 33A is pushed from the server switch unit 13, and reads out correspondence relation information from the memory 24. The LED lighting control section 25 controls the switch section 23 based on the read-out correspondence relation information and lights the LEDs 17-02 to 17-04, 17-06, 17-07, 17-16, and 17-17.

Figure 9:
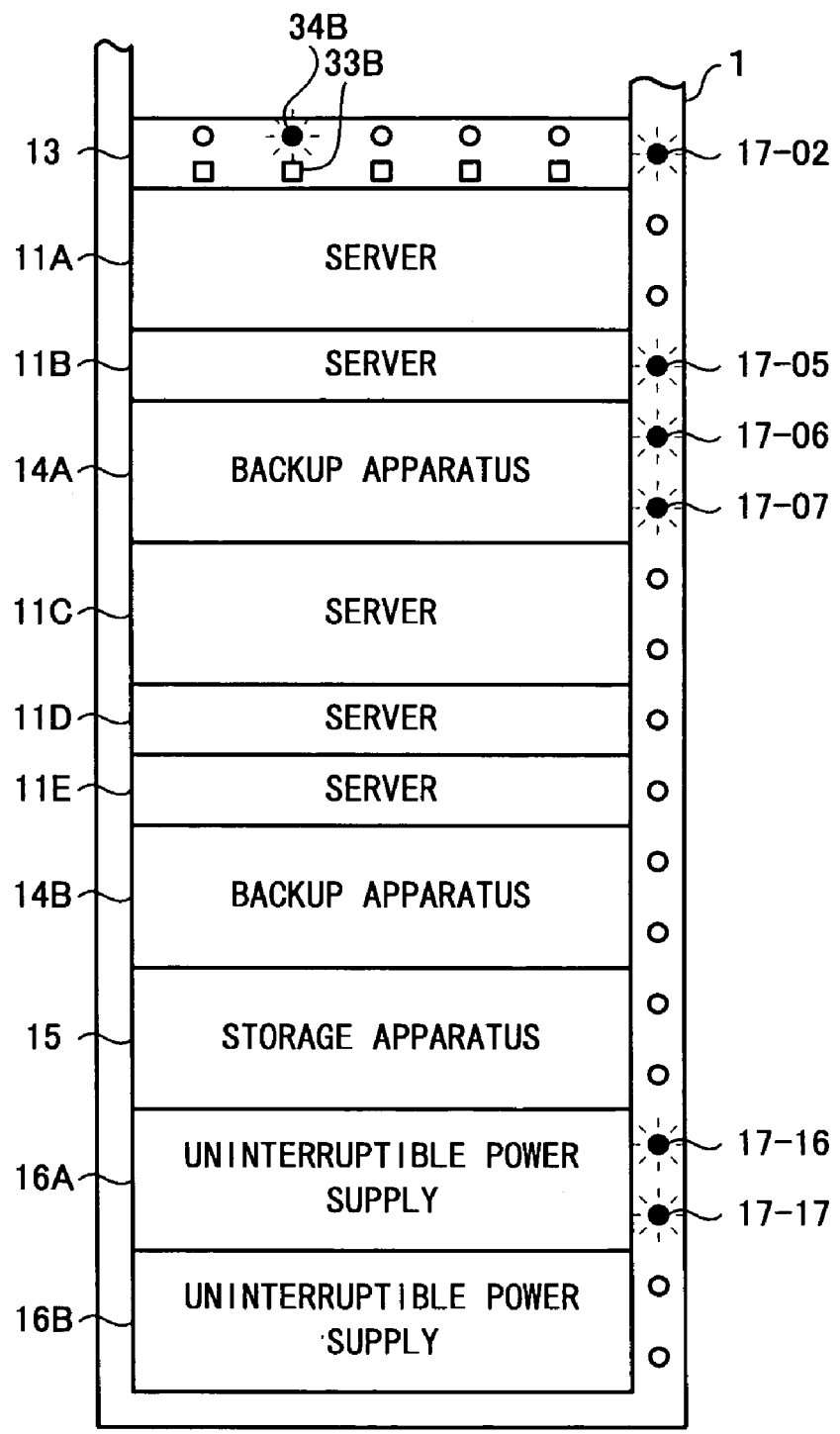
FIG. 9 is an explanatory diagram showing an example of a case where the LEDs are lit according to the modified example of the LED lighting circuit shown in FIG. 6.

Further, when the switch 33B is pushed, the server 11B is selected. In this case, the LED 34B is lit as shown in FIG. 9. The LED lighting control section 25 acquires information that the switch 33B is pushed from the server switch unit 13, and reads out correspondence relation information from the memory 24. The LED lighting control section 25 controls the switch section 23 based on the read-out correspondence relation information and lights the LED 17-02, 17-05 to 17-07, 17-16, and 17-17.

By comparing the lighting state shown in FIG. 8 with the lighting state shown in FIG. 9, it is revealed that the server 11A and the server 11B share the backup apparatus 14A.

By linking the switching operation of the server switch unit 13 and the lighting of the LEDs 17-01 to 17-19 in the above-described manner, it is possible to identify apparatuses connected to any server, only by selecting any of the servers 11A to 11E.

In the above-described embodiment, the explanation was made on the assumption that the apparatuses are shelved on the rack 1 in a horizontally-long manner. However, the rack 1 may comprise not only a structure adaptable to the horizontally-long shelving manner but also a structure adaptable to a vertically-long shelving manner. In case of the vertically-long shelving manner, the positions at which the LEDs 17-01 to 17-19 are set are determined in accordance with the structure of the rack 1.

The method of inputting the correspondence relation information is not limited to the above-described embodiment. For example, all the servers and apparatuses may be displayed on a touch panel or the like, so that correspondence relation information may be input by the touch panel, etc.

In the above-described embodiment, the structure is designed so that apparatuses which are connected to a selected server can be identified. However, the structure may be designed so that apparatuses shelved on the rack 1, for example, the backup apparatuses may be the ones to be selected and apparatuses connected to the selected backup apparatus may be identified.

Indication means for indicating the correspondence relation is not limited to an LED, but a lamp, a liquid crystal display, an electroluminescence, etc. may be used as the indication means.

The LEDs 17-01 to 17-19 may not be arranged on the front surface of the rack 1. The full correspondence relation information may be, for example, displayed on the display section 18 instead of being indicated by lighting the LEDs 17-01 to 17-19.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-342819 filed on Nov. 26, 2002 and including specification, claims, drawings and summary. The disclosure of the above Japanese Patent Application is incorporated herein by reference in its entirety.

What is claimed is:

1. A rack for shelving a plurality of devices independently in shelving units, said rack comprising:
   a storage section which pre-stores correspondence relation information indicating correspondence relations between the plurality of devices and shelving units in which apparatuses connected to the plurality of respective devices are shelved; and
   an indication section which indicates a shelving unit in which an apparatus connected to a device designated from among the plurality of devices is shelved, based on the correspondence relation information stored in said storage section.

2. The rack according to claim 1,
   wherein said indication section includes:
   shelving indication elements which correspond to the shelving units respectively; and
   an indication control section which controls said shelving indication elements to indicate a shelving unit in which an apparatus connected to a device designated from among the plurality of devices is shelved, based on the correspondence relation information stored in said storage section.

3. The rack according to claim 2,
   wherein said shelving indication elements are arranged at positions corresponding to the shelving units respectively.

4. The rack according to claim 2,
   wherein said indication control section is structured to link an indication control on said shelving indication elements with designation information for designating any of the plurality of devices shelved in the shelving units.

5. A rack for shelving a plurality of servers and apparatuses connected to the respective servers independently in shelving units, said rack comprising:
   a storage section which pre-stores correspondence relation information indicating correspondence relations between the servers and the shelving units in which the apparatuses connected to the respective servers are shelved; and
   an indication section which indicates a shelving unit in which an apparatus connected to a designated server is shelved, based on the correspondence relation information stored in said storage section.

6. The rack according to claim 5, comprising a server switch unit which includes switches for selecting the respective servers and lighting elements for indicating a server selected by any of said switches,
   wherein said indication section links its indication operation with operations made to said switches.

* * * * *